US008250060B2

US 8,250,060 B2

(12) United States Patent
Oh

(10) Patent No.: US 8,250,060 B2
(45) Date of Patent: Aug. 21, 2012

(54) FILE UPLOADING METHOD WITH FUNCTION OF ABSTRACTING INDEX INFORMATION IN REAL TIME AND WEB STORAGE SYSTEM USING THE SAME

(75) Inventor: Yoon Sik Oh, Seoul (KR)

(73) Assignee: ESTsoft Corp., Seoul (KR)

( * ) Notice: Subject to any disclaimer, the term of this patent is extended or adjusted under 35 U.S.C. 154(b) by 223 days.

(21) Appl. No.: 12/538,094

(22) Filed: Aug. 7, 2009

(65) Prior Publication Data
US 2010/0036821 A1 Feb. 11, 2010

(30) Foreign Application Priority Data

Aug. 8, 2008 (KR) .................... 10-2008-0078106

(51) Int. Cl.
*G06F 17/30* (2006.01)
(52) U.S. Cl. ...................................................... 707/711
(58) Field of Classification Search .................... 707/711
See application file for complete search history.

(56) References Cited

U.S. PATENT DOCUMENTS

2004/0205044 A1* 10/2004 Su et al. ............................ 707/2
2005/0246351 A1* 11/2005 Hadley et al. ................. 707/100

* cited by examiner

*Primary Examiner* — Rehana Perveen
*Assistant Examiner* — Alexander Khong
(74) *Attorney, Agent, or Firm* — Intellectual Property Law Group LLP

(57) ABSTRACT

A file uploading method with a function of abstracting index information in real time and a web storage system using the same are provided. The file uploading method includes: performing a data filtering on an upload target file transmitted from a user through an online network; abstracting text information as index information of the filtered upload target file; if the upload target file is not a text file, abstracting index information by abstracting text information from the filtered upload target file or converting the file into a text format by using specific information convertible into a text format; creating an inverted file by using the abstracted text information; establishing an index database by using the abstracted text information; and storing and managing the upload target file, when the transmission of the upload target file in which the index information is stored through the index database establishing operation is completed.

3 Claims, 4 Drawing Sheets

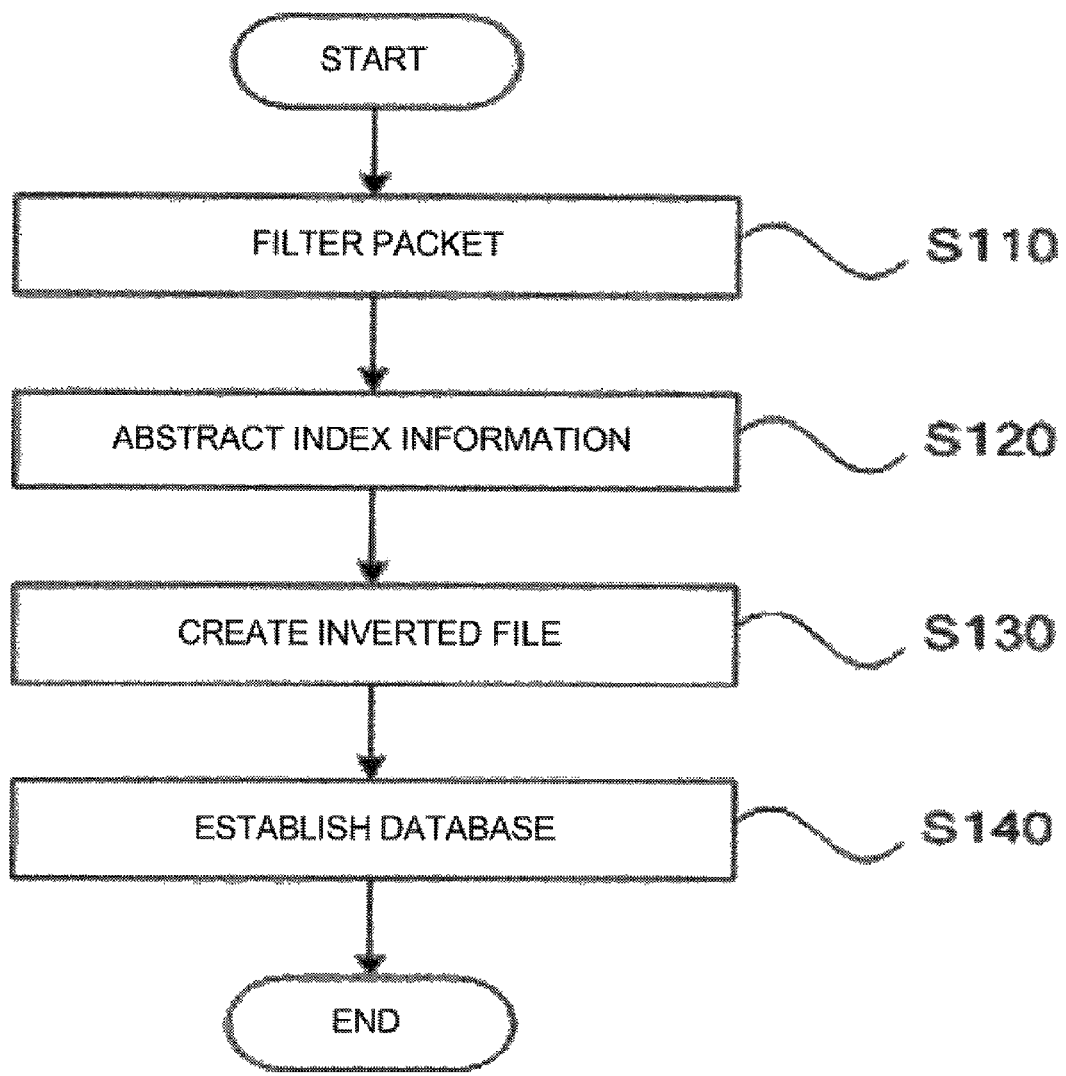

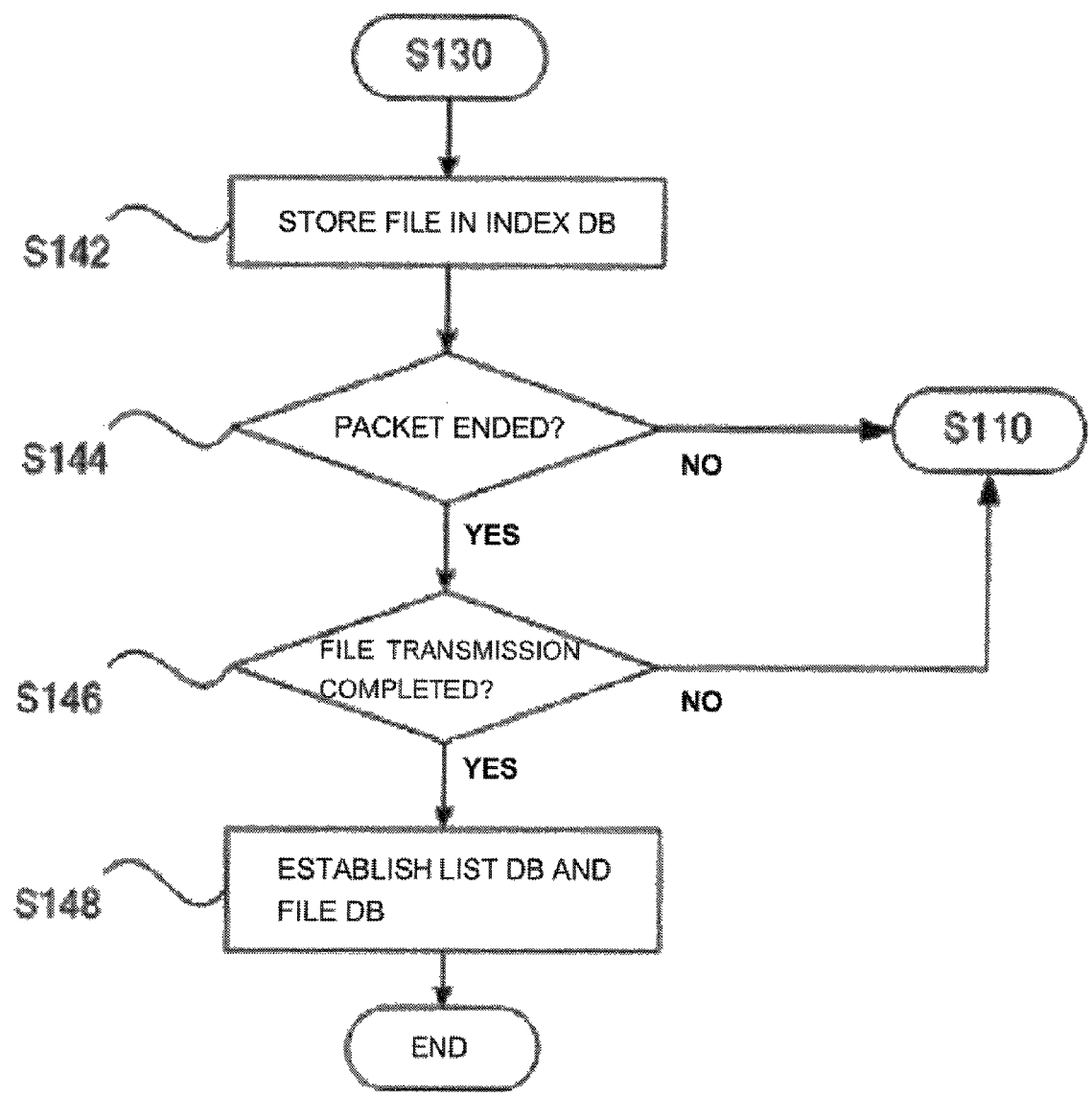

FILE UPLOADING METHOD WITH FUNCTION OF ABSTRACTING INDEX INFORMATION IN REAL TIME AND WEB STORAGE SYSTEM USING THE SAME

CROSS-REFERENCE TO RELATED APPLICATIONS

This application claims priority under 35 U.S.C. §119 to Korean Patent Application No. 10-2008-78106, filed on Aug. 8, 2008, the disclosure of which is incorporated herein by reference in its entirety.

TECHNICAL FIELD

The present invention relates to a file uploading method and a web storage system using the same, and in particular, to a file uploading method with a function of abstracting index information in real time, and a web storage system using the same.

BACKGROUND

Generally, in the case of a web storage service provided online such as Internet, a service provider operates a web storage server, and a plurality of users joined as members communicate with the web storage server by using a program distributed by a web storage server operator. In this way, a file uploading/downloading function can be executed.

Recently, as the number of web storage service providers and users utilizing them are greatly increasing, types and capacities of files managed through a web storage system are also proportionally increasing. Therefore, there has been a need for a method that can manage various types of high-capacity files in a systemic and efficient manner.

Conventionally, however, services that provide list information using names of upload-completed files and search them have been conducted. A service that searches index information abstracted from contents contained in files in order for more precise search has required a separate operation.

In other words, in order to provide an advanced search function through content information contained actually in files, it is additionally necessary to abstract index words from a large number of upload-completed files and to establish a database of the abstracted index words. Hence, the necessary time and monetary burdens are heavy.

In addition, a file indexing operation for providing list information must be performed in a server, which causes another problem such as increase of disk load.

Meanwhile, in order to search upload-completed online files, a user must download online files and search them. In this case, since search time and network traffic increase, a real-time search is substantially impossible.

Therefore, there is a need for a new solution that can efficiently index a large number of files managed by a web storage system within a range where time and monetary burdens are minimized, and can improve user's convenience such as rapid and easy search of online files.

SUMMARY

Accordingly, the present invention provides a file uploading method with a function of abstracting index information in real time, and a web storage system using the same, in which file indexing and listing operations can be simultaneously performed in a file uploading operation, thereby remarkably improving establishment of a web storage system, its management efficiency, and a user's convenient search.

Technical problems of the present invention are not limited to the technical problem set forth herein, and other technical problems can be clearly understood from the following description by a person skilled in the art.

According to an aspect, there is provided a file uploading method with a function of abstracting index information in real time, the file uploading method including: performing a data filtering on an upload target file transmitted from a user through an online network; abstracting text information as index information of the filtered upload target file; if the upload target file is not a text file, abstracting index information by abstracting text information from the filtered upload target file or converting the file into a text format by using specific information convertible into a text format; creating an inverted file by using the abstracted text information; establishing an index database by using the abstracted text information; and storing and managing the upload target file, when the transmission of the upload target file in which the index information is stored through the index database establishing operation is completed.

According to another aspect, there is provided a web storage system including: a file database storing upload files; an index database storing text information as index information of the file and storing an inverted file corresponding to the text information; a file server abstracting and storing the text information by filtering the file based on packet unit in a file uploading operation, creating an inverted file using the text information, and storing the created inverted file; and a search server searching a corresponding file using the text information and the inverted file in a file searching operation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 1A to 1C are flowcharts illustrating a file uploading method with a function of abstracting index information in real time according to an embodiment of the present invention.

DETAILED DESCRIPTION OF EMBODIMENTS

Figure 1B:
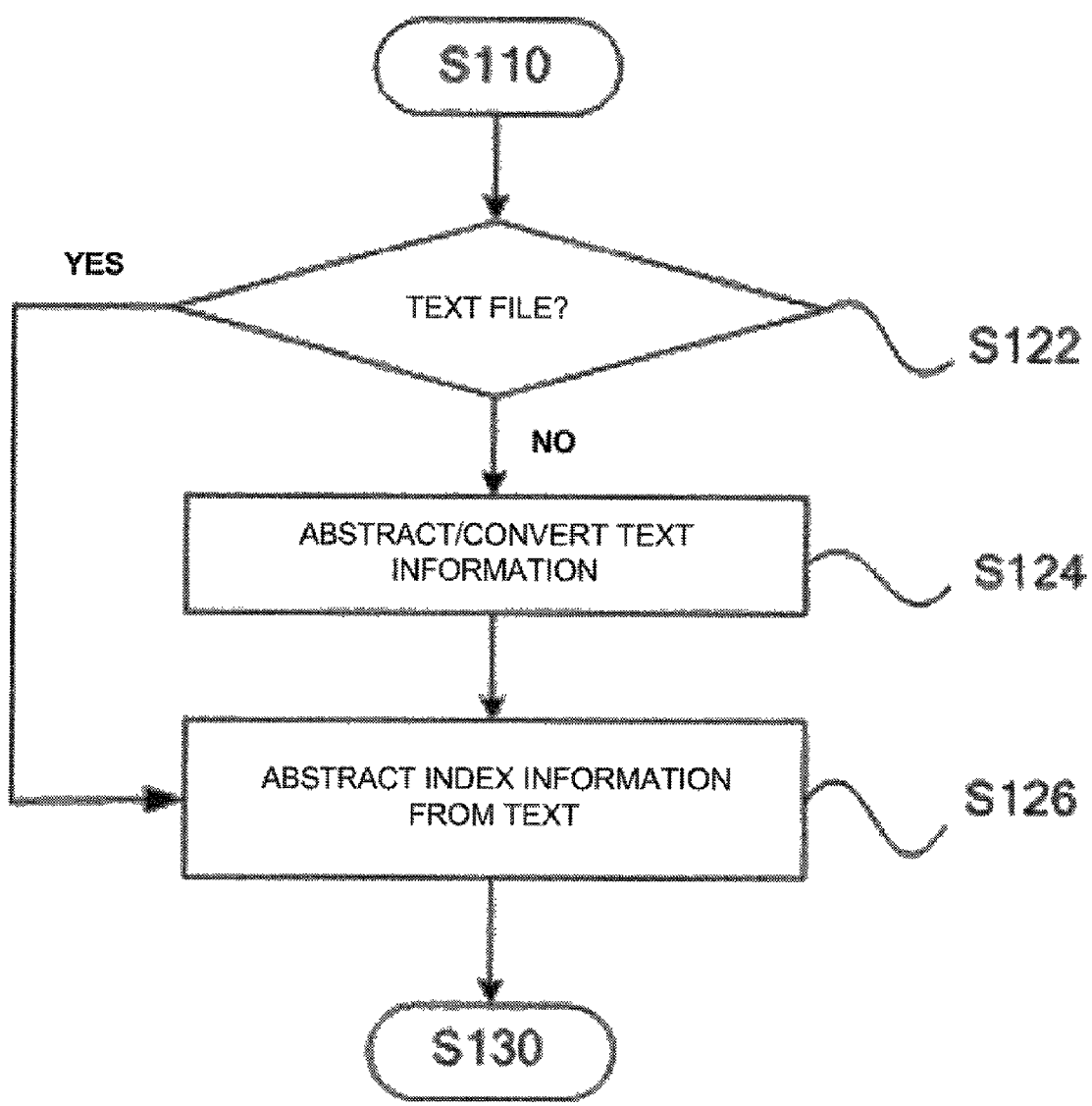

A file uploading method with a function of abstracting index information in real time according to an embodiment of the present invention includes: performing a data filtering on an upload target file transmitted from a user through an online network; abstracting text information as index information of the filtered upload target file; if the upload target file is not a text file, abstracting index information by abstracting text information from the filtered upload target file or converting the file into a text format by using specific information convertible into a text format; creating an inverted file by using the abstracted text information; establishing an index database by using the abstracted text information; and storing and managing the upload target file, when the transmission of the upload target file in which the index information is stored through the index database establishing operation is completed.

Meanwhile, there is provided a web storage system using the file uploading method with the function of abstracting index information in real time.

Details of other embodiments are included in the detailed description and drawings. Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals denote like elements throughout.

Although terms like a first, a second, and a third are used to describe various elements, components, and sections in various embodiments of the present invention, the elements, components and sections are not limited to these terms. These terms are used only to discriminate one element, component or section from another element, component or section. Therefore, an element, component or section referred to as a first element, component or section in one embodiment can be referred to as a second element, component or section in another embodiment.

In the following description, the technical terms are used only for explaining a specific exemplary embodiment while not limiting the present invention. The terms of a singular form may include plural forms unless otherwise specified. The meaning of "include," "comprise," "including," or "comprising," specifies a property, a region, a fixed number, a step, a process, an element or a component but does not exclude other properties, regions, fixed numbers, steps, processes, elements and/or components. Also, "A or B" means "A", "B", or "A and B."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s). These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s). The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

Hereinafter, exemplary embodiments of the present invention will be described in detail with reference to the accompanying drawings.

FIGS. 1A to 1C are flowcharts illustrating a file uploading method with a function of abstracting index information in real time according to an embodiment of the present invention.

In the description of the embodiment with reference to the accompanying drawings, the terms "file transmission" or "file upload" may be used together, and they refer to a file transmission scheme, including "uploading" a file to a web storage or the like. If there is no special limitation, the two terms used herein have the substantially same meaning.

Referring to FIG. 1A, a file uploading method with a function of abstracting index information according to an embodiment of the present invention includes a data filtering operation S110, an index information abstracting operation S120, an inverted file creating operation S130, an index database establishing operation S140, and a file storing/managing operation S150.

In the data filtering operation S110, when a file begins to be transmitted from a user, a server filters a transmitted file, based on certain unit of data. The data may be transmitted in a packet form.

That is, while the filtering unit of data may be set based on packet, it is preferable that it is set based on various units according to setting of a server administrator. In addition, the set packet unit may be configured so that it is variable at any time according to usage environments and requisite conditions.

When the file is filtered based on the packet unit in the data filtering operation S110, the process proceeds to the index information abstracting operation S120 to abstract index information from the file information contained within the corresponding packet. At this point, the abstractable index information may include texts, numbers, and so on, but the present invention is not limited thereto.

By abstracting the file that can serve as index information among the file information contained in the file transmitted from the user, it is allowed to be used as a keyword of the corresponding file. As the method of abstracting the index information from the file information, any information abstracting methods typically used in the web search fields may be applied.

In the file uploading method with the function of abstracting the index information in real time according the embodiment of the present invention, when the file filtered in the data filtering operation S110 is not a file (for example, a text file) from which the index information is easily abstractable (S122), it is converted into a text format by abstracting text information contained in the corresponding file or selecting information convertible into a text format (S124). Then, index information is abstracted from the text information (S126). As such, several additional operations may be further included.

Those operations are separately illustrated in FIG. 1B.

Specifically, when the upload target file is not a file from which the index information is easily abstractable (S122), text information contained in the file is abstracted through the filtering operation based on unit packet of the corresponding file, or information convertible into a text information form is abstracted by using a character recognition program. Then, text information is generated through conversion into text information through an appropriate processing (S124). Thereafter, information (texts or numbers) that can serve as index information is abstracted among the generated text information (S126).

However, the above-described index information abstracting operation S120 is merely exemplary, and it will be apparent to a person skilled in the art that the operation of abstracting information from the file being transmitted for upload and the operation of abstracting the index information may be performed by any one of various typical methods. Furthermore, it is apparent that the information serving as the index information is not limited to text or number information. However, for convenience of explanation, text information will be exemplified in FIG. 1B and its related description.

When the information serving as the index information is abstracted from the text information of the file in the index information abstracting operation S120, the inverted file of the corresponding file is configured using the abstracted index information in the inverted file creating operation S130. The inverted file is an index file that is separately created for rapidly searching a record in a file or database, and refers to one of multi key files.

When the inverted file creation using the abstracted index information is completed in the inverted file creating operation S130, an index database is established using the inverted file in the database establishing operation S140. Using the index database, the upload-completed file can be stored and managed.

This operation will be described in more detail with reference to FIG. 1C.

When the inverted file creation using the abstracted index information is completed (S130), the created inverted file data is stored in and managed by the index database (S142). Then, it is determined whether the transmission of unit packet that can be filtered (S110) is completed or not (S144). If the transmission of the packet is in progress, the filtering (S110) on next packet is performed. If the transmission of the packet is completed, it is determined whether the transmission of the entire upload file from the user is completed or not (S146).

If it is determined that the transmission of the entire file is completed (S146), the corresponding file is stored in the file database and the file list is stored in a list database (S148). If the transmission of the entire file is not completed, the filtering (S110) on next unit packet is performed.

That is, the index database is established (S142) by abstracting the index information based on unit packet of the upload target file composed of a plurality of packets (S120). Then, when the transmission of the entire file is completed, the entire file is stored in the file database and simultaneously its list file is stored in the list database (S148). In this way, the user can upload the file and simultaneously complete the establishment of the file database, the list database, and the index database.

According to the above-described file uploading method with the function of abstracting the index information in real time, the file indexing and listing operations can be simultaneously performed in the file uploading operation using the web storage system.

Therefore, it is possible to minimize time or monetary burdens necessary for systematically arranging the file index or list.

Furthermore, since a large number of files managed by the web storage system can be efficiently indexed, the users can search online files more rapidly and easily.

While it has been described in the above embodiment that the index information abstracting operation is performed through the inverted file creation, the present invention is not limited thereto. It is apparent to a person skilled in the art that the index information abstraction may be performed by any known operation.

Figure 2:
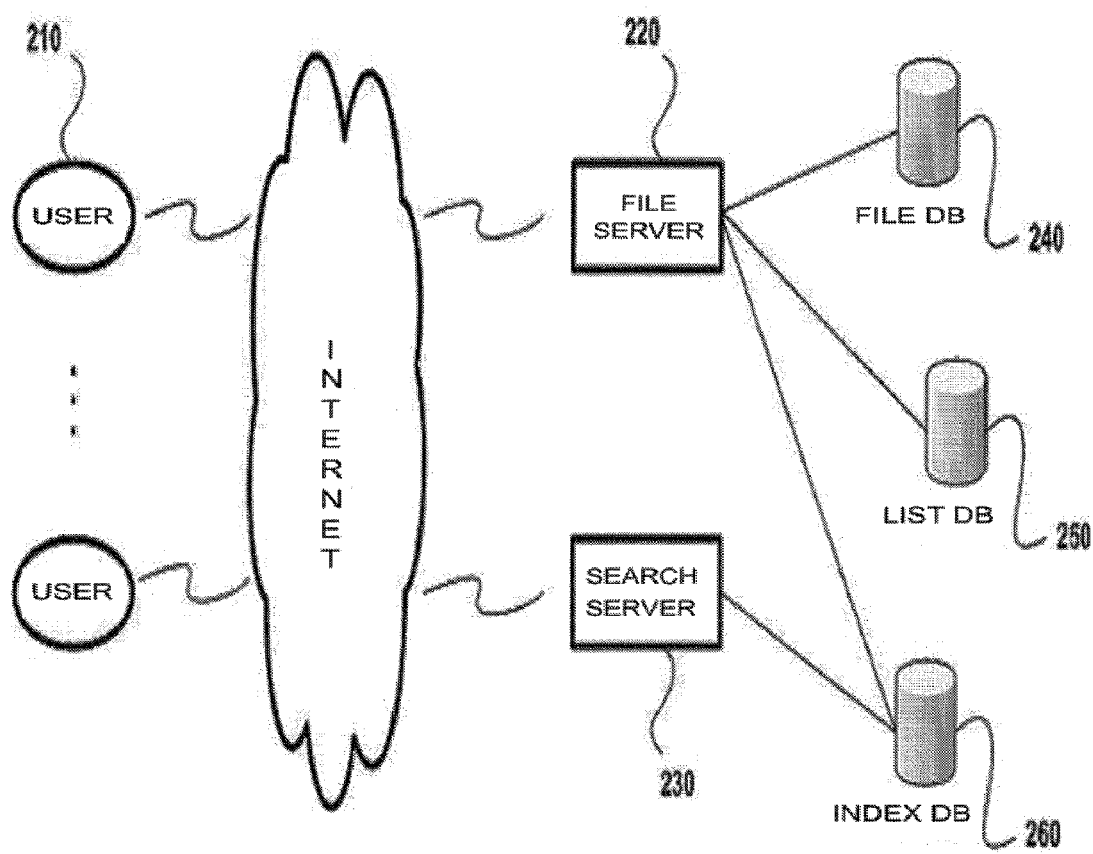
FIG. 2 is a conceptual diagram illustrating the architecture of a web storage system using the file uploading method of FIGS. 1A to 1C.

FIG. 2 is a conceptual diagram illustrating the architecture of a web storage system using the file uploading method of FIGS. 1A to 1C.

Referring to FIG. 2, the web storage system according to an embodiment of the present invention includes a file server 220 connected to a user computer 210, a search server 230, and a plurality of databases 240, 250 and 260.

Specifically, when the user 210 uploads a file to the file server 220 through the Internet, the file server 220 automatically establishes the index database 260 through various operations of abstracting file information. When the upload of the file is completed, it is stored in the file database 240 and simultaneously the file list is stored in and managed by the separate list database 250.

Therefore, the user who wants to search and download a specific file among the plurality of files managed by the file server 220 through the Internet, the actual file information can be collected correctly and easily by searching the index files of the index database 260 through the search server 230. Consequently, the search speed and search quality can be remarkably improved, compared with the case of searching the files only using the list database 250.

Since the operation of abstracting the index information from the files being transmitted for upload and establishing the database has been described in detail with reference to FIGS. 1A to 1C, its further description will be omitted.

Meanwhile, as described above, the text information abstraction of the upload files and the index information abstraction are not limited to the inverted file creating operation or the like, and it may be performed by any typical methods.

In addition, as described above, the terms "file transmission" or "file upload" used herein refer to a file transmission scheme, including "uploading" the file to the web storage or the like.

The embodiments of the present invention can be written as computer programs and can be implemented in general-purpose digital computers that execute the programs using a computer-readable recording medium. Examples of the computer-readable recording medium include magnetic storage media (e.g., ROMs, floppy disks, hard disks, etc.), optical recording media (e.g., CD-ROMs, or DVDs), and storage media such as carrier waves (e.g., transmission through the Internet).

While the embodiments of the present invention have been particularly shown and described with reference to the accompanying drawings, it will be understood by a person skilled in the art that various changes in form and details may be made therein without departing from the spirit and scope of the invention. Thus, the above-described embodiments should be considered in descriptive sense only and not for purposes of limitation.

Therefore, the scope of the invention is defined not by the detailed description of the invention but by the appended claims, and it is intended that the appended claims shall be construed to include all such variations and modifications that fall within the spirit and scope of the invention.

What is claimed is:

1. A file uploading method with a function of abstracting index information in real time, the file uploading method comprising:

performing a data filtering on an upload target file transmitted from a user through an online network based on unit packet, the filtering starting when the user begins transmitting the upload target file;

abstracting text information as index information of the filtered upload target file;

if the upload target file is not a text file, abstracting index information by abstracting text information from the filtered upload target file or converting the file into a text format by using specific information convertible into a text format;

creating an inverted file by using the abstracted text information;

establishing an index database by using the abstracted text information and storing the inverted file in the index database;

determining whether transmission of a unit packet of the upload target file is completed, wherein for a packet in which transmission is in progress, performing the data filtering on a next packet, and for a packet in which transmission is completed, determining whether transmission of the upload target file is entirely completed, and for the upload target file that is incomplete in its entire transmission, performing the data filtering on a next packet, and for the upload target file that is being completed in its entire transmission, storing and managing the upload target file, simultaneously when the transmission of the upload target file in which the index information is stored through the index database establishing operation is completed;

creating a list file simultaneously when the transmission of the upload target file in which the index information is stored through the index database establishing operation is completed; and establishing a separate database to manage the created list file.

2. The file uploading method of claim 1, wherein the index information is abstracted based on the unit packet of the upload target file, and the size of the unit packet for the upload target file is set or changed by a user.

3. A web storage system comprising:

a file database storing uploaded files;

an index database storing text information as index information of the file and storing an inverted file corresponding to the text information;

a file server abstracting and storing the text information by filtering the file based on packet unit in a file uploading operation, the filtering starting when a user begins transmitting an upload file, creating an inverted file using the text information, and storing the created inverted file, wherein for a packet of the upload file in which packet transmission is in progress, the file server filters a next packet, and for a packet in which transmission is completed, the file server determines whether the file uploading is entirely completed, and wherein for the file uploading that is incomplete, the file server filters a next packet, and for the file uploading that is completed, the file server stores the upload file in the file database, wherein establishment of the file database and index database are completed simultaneously during the file uploading operation;

a search server searching a corresponding file using the text information and the inverted file in a file searching operation; and a list database listing and managing the uploaded file, simultaneously completed with the establishment of the file database during the file uploading operation.

* * * * *